United States Patent Office 3,595,955
Patented July 27, 1971

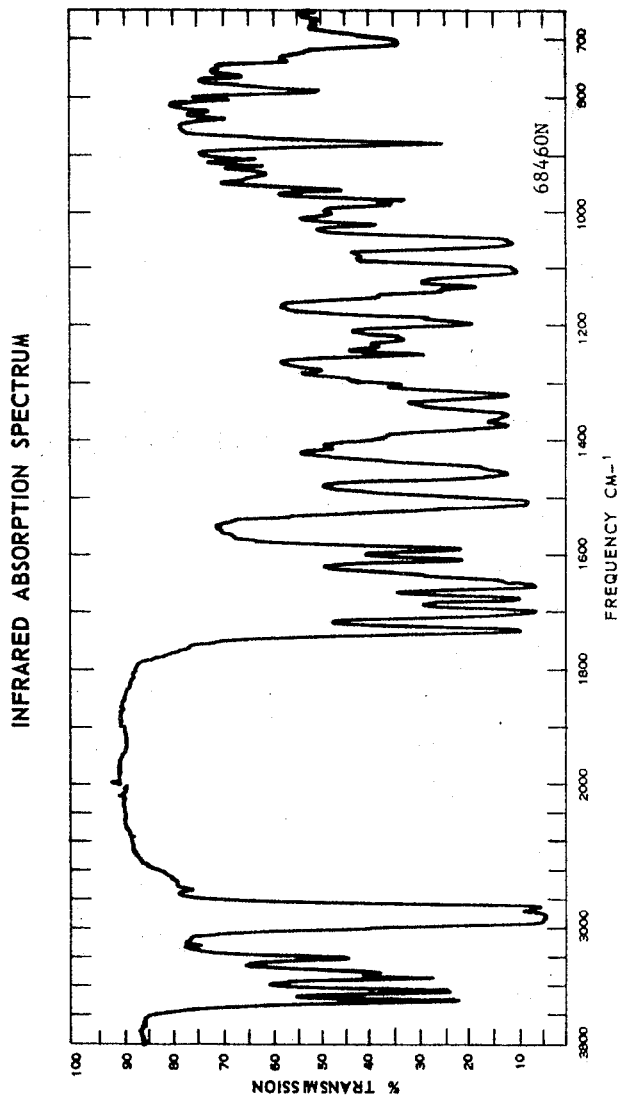

3,595,955
GELDANAMYCIN AND PROCESS FOR PRODUCING SAME
Clarence De Boer and Durey H. Peterson, Kalamazoo, Mich., assignors to The Upjohn Company, Kalamazoo, Mich.
Filed Mar. 26, 1969, Ser. No. 810,707
Int. Cl. A61k 21/00
U.S. Cl. 424—121                7 Claims

ABSTRACT OF THE DISCLOSURE

Antibiotic geldanamycin is producible by culturing *Streptomyces hygroscopicus* var. *geldanus* var. nova. in an aqueous nutrient medium. Geldanamycin is active against the nematode *Syphacia obvelata* and can be used to inhibit this nematode in mice and monkeys.

BRIEF SUMMARY OF THE INVENTION

Geldanamycin (U–29,135) is a mixture of two unresolved chemical compounds which is producible by culturing a geldanamycin-producing actinomycete in an aqueous medium. It is slightly acidic and has the property of adversely affecting the growth of various parasites and fungi, for example, *Syphacia obvelata, Tetrahymena pyriformis, Ochromonas danica,* Alternaria, Pythium, Botrytis, and Penicillium. Accordingly, geldanamycin can be used alone or in combination with other anti-parasitic agents to prevent the growth of or reduce the number of *Syphacia obvelata* in laboratory mice and monkeys.

CHEMICAL AND PHYSICAL PROPERTIES OF GELDANAMYCIN

Crystalline geldanamycin has the following chemical and physical properties:

Color: Yellow
Elemental analysis:
  Calcd. for $C_{29}H_{40}N_2O_9$ (molecular weight 560) (percent): C, 62.10; H, 7.20; N, 5.00; O, 25.70
  Calcd. for $C_{29}H_{42}N_2O_9$ (molecular weight of 562) (percent): C, 61.88; H, 7.53; N, 4.98; O, 25.61
  Found (percent): C, 61.98; H, 7.31; N, 5.27; O, 25.62
Melting point: 253–257° C.
Solubilities: Geldanamycin is soluble in lower-alkanols, e.g., methanol, ethanol, isopropanol, the butanols, and the like; chlorinated lower-alkanes, e.g., methylene chloride, chloroform, ethylene dichloride, and the like; lower-alkanones, e.g., acetone, methyl ethyl ketone, and the like. Geldanamycin is slightly soluble in water.
Infrared spectrum: The infrared absorption spectrum of geldanamycin suspended in mineral oil is reproduced in the drawing. Geldanamycin shows peaks at the following wave length expressed in reciprocal centimeters:

| | | |
|---|---|---|
| 3510 (S) | 1395 (M) | 1001 (M) |
| 3445 (S) | 1375 (S) (oil) | 985 (M) |
| 3350 (S) | 1355 (S) | 976 (M) |
| 3315 (M) | 1320 (S) | 960 (M) |
| 3215 (M) | 1305 (M) | 940 (W) |
| 3170 (W) | 1295 (M) | 933 (W) |
| 2930 (S) (oil) | 1279 (M) | 918 (W) |
| 2860 (S) (oil) | 1251 (S) | 906 (W) |
| 2730 (W) | 1235 (M) | 880 (S) |
| 1734 (S) | 1225 (M) | 836 (W) |
| 1700 (S) | 1220 (M) | 823 (W) |
| 1676 (S) | 1197 (S) | 803 (W) |
| 1655 (S) | 1187 (S) | 788 (M) |
| 1635 (S) | 1150 (M) | 762 (W) |
| 1608 (S) | 1140 (S) | 735 (W) |
| 1590 (S) | 1135 (S) | 705 (M) |
| 1510 (S) | 1108 (S) | 674 (M) |
| 1458 (S) (oil) | 1056 (S) | 664 (M) |
| 1415 (M) | 1022 (M) | |

The infrared absorption spectrum of geldanamycin in a KBR pellet shows peaks at the following wave lengths expressed in reciprocal centimeters:

| | | |
|---|---|---|
| 3555 (M) | 1500 (S) | 1020 (S) |
| 3425 (S) | 1455 (S) | 995 (M) |
| 3350 (M) | 1445 (S) | 985 (M) |
| 3300 (M) | 1370 (S) | 953 (M) |
| 3185 (M) | 1355 (S) | 934 (M) |
| 3080 (W) | 1320 (S) | 904 (W) |
| 2940 (M) | 1240 (M) | 870 (M) |
| 2920 (S) | 1220 (S) | 833 (W) |
| 2870 (M) | 1190 (S) | 822 (W) |
| 2820 (M) | 1150 (M) | 800 (W) |
| 1730 (S) | 1130 (S) | 780 (M) |
| 1690 (S) | 1095 (S) | 750 (M) |
| 1645 (S) | 1055 (S) | 730 (M) |
| 1630 (S) | 1045 (S) | 690 (M) |
| 1600 (S) | | |

Band intensities are indicated as "S," "M," and "W," respectively, and are approximated in terms of the backgrounds in the vicinity of the bands. An "S" band is of the same order of intensity as the strongest in the spectrum; "M" bands are between one-third and two-thirds as intense as the strongest band, and "W" bands are less than one-third as intense as the strongest band. These estimates are made on the basis of a percent transmission scale.

Optical rotation: $[\alpha]_D^{25}$ +55 to +58° (CHCl$_3$, c.=0.523) Equivalent weight: 560
U.V. absorption spectrum:
  End absorption in methanol—

| M$\mu$ | a |
|---|---|
| 257 | 30.16 |
| 305 | 33.93 |
| 400 | 1.77 |

End absorption in 0.1 N KOH in methanol—

| M$\mu$ | a |
|---|---|
| 236 | 41.65 |
| 261 | 40.87 |
| 307 | 19.51 |
| 540 | 4.09 |

End absorption in 0.1 N HCl in methanol—

| M$\mu$ | a |
|---|---|
| 256 | 29.92 |
| 303 | 31.17 |
| 400 | 1.51 |

BIOLOGICAL CHARACTERISTICS OF GELDANAMYCIN

In vitro: Crystalline geldanamycin is extremely active against KB cells (human epidermoid carcinoma cells) at a concentration of less than 0.001 mcg./ml., and L1210 (leukemia mouse lymphocyte) cells at a concentration of less than 0.002 mcg./ml. Geldanamycin also has moderate activity against certain genera of fungal plant pathogens, for example, Alternaria, Pythium, Botrytis, and Penicillium. It also has a low order of activity against Gram-positive bacteria, for example, *Staphylococcus aureus*, and the Gram-negative fish pathogen, *Aeromonas salmonicida*.

Geldanamycin has the following antibacterial spectrum when tested in a standard Brain Heart Infusion broth test incubated at 28° C.

| Test microorganism | Inhibitory concentration of geldanamycin in mcg./ml. | |
|---|---|---|
| | 16 hours | 40 hours |
| Ps. aeruginosa | >100 | 100 |
| P. vulgaris | 50 | >100 |
| P. multocida | 25 | 100 |
| K. pneumoniae | 50 | 100 |
| F. suaveolens | 12.5 | 100 |
| E. coli | 50 | 100 |
| A. aerogenes | 100 | >100 |
| B. cereus | 25 | 100 |
| B. subtilis | 25 | 100 |
| S. viridans | 100 | 100 |
| S. schottmuelleri | 50 | 100 |
| S. pyogenes | 12.5 | 50 |
| S. faecalis | 50 | 100 |
| S. aureus | 12.5 | 50 |
| S. dysenteriae | 25 | 100 |
| S. typhosa | 50 | >100 |
| S. pullorum | 25 | 100 |
| A. salmonicida | 25 | 50 |
| C. violaceum | 12.5 | 25 |
| A. liquefasciens | 50 | 25 |

In vivo: In laboratory mice, geldanamycin is active against the parasite *Syphacia obvelata*.

THE MICROORGANISM

The actinomycete used according to this invention for the production of geldanamycin is *Streptomyces hygroscopicus* var. *geldanus* var. nova. One of its strain characteristics is the production of geldanamycin. A subculture of the living organism was deposited without restriction and can be obtained from the permanent collection of the Northern Utilization and Research Division, Agricultural Research, U.S. Department of Agriculture, Peoria, Ill., U.S.A. Its accession number in this repository is NRRL 3602.

The microorganism of this invention was studied and characterized by Alma Dietz of The Upjohn Research Laboratories.

*S. hygroscopicus* v. *geldanus* is a new soil isolate of the genus Streptomyces which has been found to differ in certain characteristics from the type culture *Streptomyces hygroscopicus*. The new variety is readily distinguished by its ability to produce geldanamycin. Other distinguishing characteristics may be noted by a perusal of the cultural characteristics given in the description. These characteristics are not of significant value to merit the creation of a new species. The new soil isolate is readily characterized as a hygroscopicus by the strong color pattern and microscopic characteristics of the type species.

DESCRIPTION OF THE MICROORGANISM

*Streptomyces hygroscopicus* var. *geldanus* is compared with the type species *Streptomyces hygroscopicus* (Jensen) Waksman CBS.

Color characteristics: Aerial growth white to gray-white or gray-cream to gray. Moist, black, hygroscopic patches on some media. Melanin-negative. Appearance on Ektachrome is given in Table 1. Reference color characteristics are given in Table 2. The cultures may be placed in the White (W) and Gray (GY) color series of Tresner and Backus [Appl. Microbiol. 11:335–338 (1962)].

Microscopic characteristics: Sporophores in tight spirals mostly in hydroscopic masses. Sporophores spiral (S) in the sense of Pridham et al. [Appl. Microbiol: 6:52–79 (1958)]. Spores smooth with an irregular possibly warty surface by direct electron microscope examination. Spore surface morel-like when examined by the carbon replication method of Dietz and Mathews [Applied Microbiol. 16:935–941 (1968)].

Cultural and Biochemical Characteristics: See Table 3.

Carbon Utilization: The ability of the culture to grow on carbon compounds was determined in the synthetic medium of Pridham and Gottlieb [J. Bacteriol. 56:107–114 (1948)] and in their modified medium [International Journal of Systematic Bacteriology 16:313–340 (1966)]. In Pridham and Gottlieb's medium, both cultures grew well on D-xylose, L-arabinose, rhamnose, D-fructose, D-galactose, D-glucose, D-mannose, maltose, lactose, cellobiose, raffinose, dextrin, soluble starch, glycerol, D-mannitol, D-sorbitol, sodium acetate, sodium citrate and sodium succinate. Growth was moderate on sucrose and salicin; poor on inulin, and the control; negative on phenol, cresol and sodium salicylate. The cultures showed the following minor differences: The type culture had moderate growth on dulcitol, inositol, sodium oxalate, and sodium tartrate, whereas the new variety had good growth. On sodium formate, the former had poor growth, the latter had no growth. In the modified medium, both cultures grew poorly on the basal medium without a carbon compound and well on the glucose control. Growth was also good on the basal medium with L-arabinose, D-xylose, D-mannitol, D-fructose, rhammose, and raffinose; somewhat less (moderate) on cellulose. The two cultures differed in growth on two compounds—on sucrose the type culture had moderate growth and the new variety doubtful growth; on inositol the type culture had doubtful growth and the new variety good growth.

Temperature: Both cultures grew well at temperatures of 18–28C and moderately well at 37C. There was a trace of vegetative growth in 24 hours at 55° C.

Antibiotic-producing Properties: The type culture, *Streptomyces hygroscopicus*, is reported to produce hygromycin [Actinomycetes, and Their Antibiotics, pp. 40–41 (1963)]. In our laboratory the culture gave good assay zones on *Bacillus subtilis, Staphylococcus aureus, Sarcina lutea,* and *Penicillium oxalicum* seeded trays and poor zones on *Mycobacterium avium, Klebsiella pneumoniae, Escherichia coli,* and *Saccharomyces cerevisiae* seeded trays. No papergrams were obtained with one spotting on System V[1] and plating on *P. oxalicum* and *Staphylococcus aureus*.

[1] Butanol, water (4:96), 5 hours.

The new variety *S. hygroscopicus* v. *geldanus* has poor *Bacillus subtilis, Staphylococcus aureus, Mycobacterium avium,* and *Sarcina lutea* assay zones and good *Penicillium oxalicum* and *Saccharomyces pastorianus* assay zones. No papergrams were obtained from one spotting in System V and plating against *P. oxalicum*.

The new variety has strong antiprotozoal activity, and it produces the antibiotic geldanamycin.

The characteristics of *Streptomyces hygroscopicus* Dietz, sp. nov., NRRL 3602, are given in the following tables:

Table 1—Appearance of *S. hydroscopicus* cultures on Ektachrome

Table 2—Reference Color Characteristics of *S. hygroscopicus* cultures

Table 3—Cultural and Biochemical Characteristics of *S. hygroscopicus* cultures

TABLE 1
[Appearance of *S. hygroscopicus* cultures on Ektachrome [1]]

| Agar medium | | S. hygroscopicus var. geldanus | S. hygroscopicus |
|---|---|---|---|
| Bennett's | S | Gray | Gray-white. |
| | R | Yellow-tan | Yellow. |
| Czapek's sucrose | S | Gray-white | Gray. |
| | R | Yellow-gray | Do. |
| Maltose-tryptone | S | Pale gray-white | Trace gray-white. |
| | R | Yellow | Yellow. |
| Peptone-iron | S | | |
| | R | Yellow | Do. |
| 0.1% tyrosine | S | Trace gray-white | Trace gray. |
| | R | Red | Red. |
| Casein starch | S | Gray white | Gray. |
| | R | Yellow-gray | Yellow-gray. |

[1] Dietz, A., "Ektachrome Transparencies as Aids in Actinomycete Classification," Annals of the New York Academy of Sciences, 60:152–154, 1954.

NOTE.—S = Surface; R = Reverse.

TABLE 2

[Reference color characteristics of S. hygroscopicus cultures]

| Agar medium | | Color Harmony Manual, 3d ed. 1948 [1] | | NBS Circular 553, 1955 [2] | |
|---|---|---|---|---|---|
| | | S. hygroscopicus v. geldanus | S. hygroscopicus | S. hygroscopicus v. geldanus | S. hygroscopicus |
| Bennett's | S | 2fe (g) covert gray | 1fe (g) griege, citron gray | 94 g light olive brown, 112 gm light olive gray. | 112 m light olive gray, 122 g grayish yellow-green. |
| | R | 2gc (m) bamboo, chamois | 2gc (g) bamboo, chamois | 90 gm grayish yellow | 90 gm grayish yellow. |
| | P | 3ec (g) bisque, light beige | 2ec (g) biscuit, ecru, oatmeal, sand. | 79 gm light grayish yellowish brown, 90 g grayish yellow. | Do. |
| Czapek's sucrose | S | 3dc (g) natural | 3fe (m) silver gray | | 63 gm light brownish gray. |
| | R | 1dc (m) putty, griege | 1fe (m) griege, citron gray | 121 gm pale yellow green | 112 m light olive gray, 122 g grayish yellow green. |
| | P | | | | |
| Maltose-tryptone | S | 2ba (m) pearl, shell tint | 2cb (m) ivory tint | 92 gm yellowish white | 92 m yellowish white, 93 m yellowish gray. |
| | R | 2gc (g) bamboo, chamois | 2ec (g) biscuit, ecru, oatmeal, sand. | 90 gm grayish yellow | 90 gm grayish yellow. |
| | P | | | | |
| Yeast extract-malt extract | S | 2fe (m) covert gray | 1dc (m) griege, citron gray | 94 g light olive brown, 112 gm light olive gray. | 121 gm pale yellow green. |
| | R | 2gc (g) bamboo, chamois | 2gc (m) bamboo, chamois | 90 gm grayish yellow | 90 gm grayish yellow. |
| | P | 2ge (g) covert tan, griege | 2gc (g) bamboo, chamois | do | Do. |
| Oatmeal (ISP-3) | S | 3fe (g) silver gray | 2fe (g) covert gray | 63 gm light brownish gray | 94 g light olive brown, 112 gm light olive gray. |
| | R | 2ec (g) biscuit, ecru, oatmeal, sand. | 2dc (g) natural, string | 90 gm grayish yellow | 93 m yellowish gray. |
| | P | 1½ec (g) putty | 1dc (m) putty, griege | 90 gm grayish yellow, 93 m yellowish gray. | 121 gm pale yellow green. |
| Inorganic salts-starch (ISP-4) | S | 2fe (m) covert gray | 2fe (g) covert gray | 94 g light olive brown, 112 gm light olive gray. | 94 g light olive brown, 112 gm light olive gray. |
| | R | 2ec (m) biscuit, ecru, oatmeal, sand. | 3fe (g) silver gray | 90 gm grayish yellow | 63 gm light brownish gray. |
| | P | 2cb (g) ivory tint | 2dc (g) natural, string | 92 m yellowish white, 93 gm yellowish gray. | 93 m yellowish gray. |
| Glycerolasparagine (ISP-5) | S | 2fe (m) covert gray | b (m) oyster white | 94 g light olive brown, 112 gm light olive gray. | 263 m white, 264 g light gray. |
| | R | 2ec (g) biscuit, ecru, oatmeal, sand. | 2cb (g) ivory tint | 90 gm grayish yellow | 92 m yellowish white, 93 gm yellowish gray. |
| | P | | | | |

[1] Jacobson, E., W. C. Granville, and C. E. Foss. 1948. Color Harmony Manual, 3d ed. Container Corporation of America, Chicago, Ill.
[2] Kelly, L. K., and D. B. Judd. 1955. The ISCC-NBS Method of Designating Colors and a Dictionary of Color Names. U.S. Dept. of Commerce Circular 553.
NOTE.—S=Surface; R=Reverse; P=Pigment; (g)=glossy; (m)=matte.

TABLE 3

[Cultural and biochemical characteristics of S. hygroscopicus cultures]

| Agar media: | | S. hygroscopicus var. geldanus | S. hygroscopicus |
|---|---|---|---|
| Peptone-iron | S | Gray white | V.s. trade white. |
| | R | Yellow tan | Yellow tan. |
| | P | Melanin | Melanin. |
| Calcium malate | S | Trace white | Trace white. |
| | R | Colorless | Colorless. |
| | P | No pigment | No pigment. |
| | O | Malate not solubilized | Malate not solubilized. |
| Glucose-asparagine | S | Gray white | Gray white. |
| | R | Cream gray | Cream. |
| | P | Pale pink pigment | No pigment. |
| Skim milk | S | White | Gray pink white. |
| | R | Yellow | Yellow pink tan. |
| | P | Yellow pigment | Yellow pink pigment. |
| | O | Casein solubilized | Casein solubilized around growth. |
| Tyrosine | S | Gray cream | Gray. |
| | R | Red tan | Red tan. |
| | P | Red tan pigment | Red tan pigment. |
| | O | Tyrosine solubilized | Tyrosine solubilized. |
| Xanthine | S | Cream gray | Trace gray white. |
| | R | Pale yellow | Pale yellow. |
| | P | No pigment | No pigment. |
| | O | Xanthine solubilized around growth. | Xanthine not solubilized. |
| Yeast extract-malt extract | S | Gray white | Cream gray white with moist black patches. |
| | R | Olive | Yellow olive. |
| | P | No pigment | No pigment. |
| Casein starch | S | Gray | Gray. |
| | R | do | Do. |
| | P | No pigment | No pigment. |
| | O | Starch hydrolyzed | Starch hydrolyzed. |
| Nutrient starch | S | White | White. |
| | R | Cream | Cream. |
| | P | Pale yellow pigment | Pale yellow pigment. |
| | O | Starch hydrolyzed | Starch hydrolyzed. |
| Sabouraud's dextrose | S | White with gray | White. |
| | R | Yellow tan orange | Yellow tan orange. |
| | P | No pigment | No pigment. |
| Bennett's | S | Heavy gray white | Heavy gray white. |
| | R | Yellow | Yellow. |
| | P | No pigment | No pigment. |
| Czapek's sucrose | S | Heavy gray | Heavy gray. |
| | R | Gray | Gray. |
| | P | No pigment | No pigment. |
| Maltose tryptone | S | Gray white | Gray white. |
| | R | Yellow | Yellow. |
| | P | No pigment | No pigment. |
| Peptone-yeast extract-iron (ISP-6). | S | Trace white | No aerial growth. |
| | R | Yellow | Yellow. |
| | P | Pale yellow pigment | Pale yellow pigment. |
| Tyrosine (ISP-7) | S | Gray | Gray. |
| | R | Tan | Tan. |
| | P | Tan pigment | Pale pink becoming pink tan. |

TABLE 3.—Continued

[Cultural and biochemical characteristics of *S. hygroscopicus* cultures]

| | | *S. hygroscopicus* var. *geldanus* | *S. hygroscopicus* |
|---|---|---|---|
| Gelatin media: | | | |
| Plain | S | | |
| | P | Tan ¼ | Tan ¼. |
| | O | ⅓ complete liquefaction | ⅓–¾ liquefaction. |
| Nutrient | S | | |
| | P | Tan ¼ | Tan ¼. |
| | O | Complete liquefaction | ½ complete liquefaction. |
| Broth media: | | | |
| Synthetic nitrate | S | White aerial growth on surface pellicle. | Gray aerial growth on surface pellicle. |
| | P | Pale yellow | Pale yellow. |
| | O | Compact to flocculent bottom growth. Nitrate reduced to nitrite. | Compact to flocculent bottom growth. Nitrate not reduced to nitrite. |
| Nutrient nitrate | S | No aerial growth | No aerial growth. |
| | P | None | None. |
| | O | Compact to flocculent bottom growth. Nitrate not reduced to nitrite. | Compact to flocculent bottom growth. Nitrate not reduced to nitrite. |
| Litmus milk | S | Gray-white aerial growth on blue-gray surface ring. | Tan surface ring. |
| | O | Peptonization complete, pH 7.2. | Peptonization partial, pH 6.6. |

NOTE.—S=Surface; R=Reverse; P=Pigment; O=Other characteristics.

The new compound of the invention is produced when the elaborating organism is grown in an aqueous nutrient medium under submerged aerobic conditions. It is to be understood also that for the preparation of limited amounts, surface cultures and bottles can be employed. The organism is grown in a nutrient medium containing a carbon source, for example, an assimilable carbohydrate, and a nitrogen source, for example, an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquor, yeasts, autolyzed brewer's yeast with milk solids, soybean meal, cottonseed meal, cornmeal, milk solids, pancreatic digest of casein, distillers' solubles, animal peptone liquors, meat and bone scraps, and the like. Combinations of these carbon and nitrogen sources can be used advantageously. Trace metals, for example, zinc, magnesium, manganese, cobalt, iron and the like need not be added to the fermentation medium since tap water and unpurified ingredients are used as medium components.

Production of the compound of the invention can be effected at any temperature conducive to satisfactory growth of the microorganism, for example, between about 18° and 40° C., and preferably between about 20° and 32° C. Ordinarily, optimum production of the compound is obtained in about 2 to 10 days. The medium normally remains weakly acidic (pH 5.5–7.0) during the fermentation. The final pH is dependent, in part on the buffers present, if any, and in part on the initial pH of the culture medium which is advantageously adjusted to about pH 7.0 prior to sterilization.

When growth is carried out in large vessels and tanks, it is preferable to use the vegetative form, rather than the spore form, of the microorganism for inoculation to avoid a pronounced lag in the production of the new compound and the attendant inefficient utilization of the equipment. Accordingly, it is desirable to produce a vegetative inoculum in a nutrient broth culture by inoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the new compound, as long as it is such that a good growth of the microorganism is obtained.

The new compounds of the invention is a mixture of two unresolved chemical entities. The analytical data best fit the formulas $C_{29}H_{40}N_2O_9$ and $C_{29}H_{42}N_2O_9$. Geldanamycin is slightly soluble in water, and soluble in lower alkanols, e.g., methanol, ethanol, isopropyl, the butanols, and the like; chlorinated lower-alkanes, e.g., methylene chloride, chloroform, ethylene dichloride, and the like; and lower-alkanones, e.g., acetone, methyl ethyl ketone, and the like.

A variety of procedures can be employed in the isolation and purification of geldanamycin, for example, solvent extraction, silica gel chromatography, liquid-liquid distribution in a Craig apparatus, and crystallization from solvents. Solvent extraction procedures are preferred for commercial recovery inasmuch as they are less time-consuming and less expensive. Silica gel chromatography is a preferred purification procedure.

In a preferred recovery process, geldanamycin is recovered from its culture medium by separation of the mycelial and undissolved solids by conventional means, such as by filtration or by centrifugation. The antibiotic is then removed from the filtered or centrifuged broth by extraction. For the extraction of geldanamycin from the filtered broth, water-immiscible solvents in which it is soluble, for example, Skellysolve B (isomeric hexanes), ethyl acetate, butanol, and methylene chloride can be used. A mixture of n-butanol:$CHCl_3$ (1:1) is the preferred extraction solvent. The extract containing the antibiotic can be concentrated in vacuo.

Purification of the concentrated solvent extract, or other residue containing antibiotic geldanamycin, can be accomplished by passing the concentrate, after solution in an organic solvent, for example, 95% chloroform-5% methanol, over a silica gel chromatography column. The column can be eluted with this solvent. The eluate from the chromatography column is concentrated in vacuo at which time crystals of geldanamycin appear. The crystals can be removed by filtration and dried.

An alternate purification process can be carried out by crystallizing geldanamycin directly from the concentrated butanol extract, described above. These crystals can be recrystallized by dissolving in hot chloroform. The solution can be filtered to yield relatively pure crystals of geldanamycin.

The new compound of the invention, geldanamycin, can be used to treat laboratory mice and monkeys infected with the nematode *Syphacia obvelata*. Also, geldanamycin can be used as a disinfectant on various dental and medical equipment contaminated with *Staphylococcus aureus*; also, geldanamycin can be used as a disinfectant on laboratory benches contaminated with *Staphylococcus aureus*.

The following examples are illustrative of the process and products of the present invention, but are not to be construed as limiting. All percentages are by weight and all solvent mixture proportions are by volume unless otherwise noted.

EXAMPLE 1

(A) Fermentation

A soil stock of *Streptomyces hygroscopicus* var. *geldanus* var. nova, NRRL 3602, is used to inoculate a series of 500-ml. Erlenmeyer flasks, each containing 100 ml. of sterile seed medium consisting of the following ingredients:

| | |
|---|---|
| Glucose monohydrate | g./l. 10 |
| Yeast extract | g./l. 2.5 |
| Peptone | g./l. 10 |
| Tap water q.s. | Balance |

The flasks are grown for 3 days at 28° C. on a rotary shaker. Five milliliters of the seed inoculum, described above, is used to inoculate each of a series of 500 ml. Erlenmeyer flasks containing 100 ml. of the following sterile fermentation medium:

| | |
|---|---|
| Glucose monohydrate | g./l. 40 |
| Yeast extract [1] | g./l. 2.5 |
| Peptone [1] | g./l. 2.5 |
| Tryptone [1] | g./l. 2.5 |
| Gerber's oatmeal [2] | g./l. 5.0 |
| Brer Rabbit molasses [3] (Green label) | ml. 10 |
| Tap water q.s. | Balance |

[1] These nutrients sold by Difco Laboratories, Detroit, Mich.
[2] Sold by Gerber Foods, Fremont, Mich.
[3] Sold by Penick and Ford, New Orleans, La.

The fermentation flasks are incubated for 5 days at a temperature of 28° C. on a rotary shaker. A representative geldanamycin fermentation assays about 96–128 BU/ml. at 96 hours against the microorganism *T. pyriformis*. The assay is conducted as follows:

(1) Medium: The medium consists of two parts, A and B, which are autoclaved separately at 20 p.s.i. for 20 minutes at 121° C. After cooling to 38–40 C., they are combined in equal parts.

Part A, (75 ml.):
  2% glucose
  2% Difco proteose-peptone #3.
  0.2% Difco Yeastolate
  q.s. with distilled water Part B, (75 ml.):
  0.8% Lonagar #2 (oxoid) [1]
  q.s. with distilled water

[1] Oxo Limited, London, England.

(2) Inoculum: *Tetrahymena pyriformis* is grown in a medium consisting of 1% glucose, 1% Difco proteose-peptone No. 3, and .1% Yeastolate and distilled water, at 25–28° C. Sterile air is bubbled slowly into the medium. There is no agitation. A 20% inoculum with a 35–45% transmission at 530 millimicrons on a Model 401 Lumetron Colorimeter is used.

(3) Preparation of trays: Sterile plastic trays 21″ x 9″) are used. 175 ml. of seeded agar is poured into the trays.

(4) Incubation of trays: The trays are incubated at 25–28° C. under normal lighting conditions. The trays should be read at 18 hours, and, if not sufficiently clear, read again at 42 hours. The trays should not be tipped or slanted during incubation and reading.

A biounit (BU) is defined as the concentration of the antibiotic which gives a 20 mm. zone of inhibition under standard assay conditions. Thus, for example, if a fermentation beer has to be diluted 1/100 to give a 20 mm. zone of inhibition, the potency of such beer is 100 BU/ml.

(B) Extraction and purification

Whole beer (Part A) is filtered using diatomaceous earth as a filter aid. The filter cake is extracted once with methylene chloride-n-butanol (1:1) using 1/20 by volume of original beer. This extract is added to the original filtered beer. The original filtered beer is then extracted three times with n-butanol using one-third the volume of the original beer each time. The spent beer is discarded. The solvent extracts are concentrated in vacuo to 1/25–1/30 the volume of the combined extracts. Crystals of geldanamycin are then filtered off. These crystals are chromatographed over a silica gel column as follows:

For each gram of crystalline solid there is used 100 g. of Silica Gel G (Merck Darmstadt). The Silica Gel G is suspended in 95% chloroform-5% methanol (by vol.) to make up the column. The crystalline solids of geldanamycin are dissolved in the least amount of 95% chloroform-5% methanol (by vol.). The column is eluted with a solvent system consisting of 90 to 95% methylene chloride-5 to 10% methanol (by vol.). Active fractions, as determined by assay against *Tetrahymena pyriformis* described above, are dissolved in boiling methylene chloride, filtered and concentrated in vacuo. Upon the addition of methanol, with stirring, crystals of geldanamycin begin to appear. The crystals are placed in a refrigerator overnight and then recovered by filtration and washed with ice-cold methanol. After vacuum drying, yellow crystals of geldanamycin having a melting point of 253–266° C. are recovered.

Using the above procedure, the following results are obtained:

| Step | Quantity (liters) | Assay (BU/ml.) |
|---|---|---|
| Whole fermentation beer | 470 | 64 |
| 1st n-BuOH extract | 140 | 128 |
| 2d n-BuOH extract | 120 | 40 |
| 3d n-BuOH extract | 190 | 4 |
| Concentrated pooled BuOH extract | 5.5 | 5120 |
| Purified crystals | [1] 5.497 | [2] 240 |

[1] Grams.
[2] BU/mg.

We claim:

1. Geldanamycin, an antibiotic mixture which:
    (a) is effective in inhibiting the growth of various Gram-positive and Gram-negative bacteria, fungi, and nematodes; and which in its essentially pure crystalline form;
    (b) is soluble in methanol, ethanol, isopropanol, the butanols, methylene chloride, chloroform, ethylene dichloride, acetone, methyl ethyl ketone, and ethyl acetate; and is slightly soluble in water;
    (c) has a melting point of 253–257° C.;
    (d) has an optical rotation $[\alpha]_D^{25}$ +55 to +58° (CHCl$_3$, c.=0.523);
    (e) has a characteristic infrared absorption spectrum as shown in the accompanying drawing;
    (f) has a calculated molecular weight of about 562;
    (g) has the following elemental analyses: C, 61.98; H, 7.31; N, 5.27; O, 25.62;
    (h) has an equivalent weight of 560; and
    (i) has the following UV absorption spectrum:

End absorption in methanol—

| M$\mu$: | a |
|---|---|
| 257 | 30.16 |
| 305 | 33.93 |
| 400 | 1.77 |

End absorption in 0.1 N KOH in methanol—

| M$\mu$: | a |
|---|---|
| 236 | 41.65 |
| 261 | 40.87 |
| 307 | 19.51 |
| 540 | 4.09 |

End absorption in 0.1 N HCl in methanol—

| M$\mu$: | a |
|---|---|
| 256 | 29.92 |
| 303 | 31.17 |
| 400 | 1.51 |

2. A composition of matter assaying at least 96 BU/ml. of geldanamycin, the antibiotic mixture characterized in claim 1.

3. The antibiotic geldanamycin, according to claim 1, in its essentially pure form.

4. The antibiotic geldanamycin, according to claim 1, in its essentially pure crystalline form.

5. A process for making the antibiotic defined in claim 1 which comprises cultivating *Streptomyces hygroscopicus* var. *geldanus*, having the identifying characteristics of NRRL 3602, in an aqueous nutrient medium under aerobic conditions until substantial antibiotic activity is imparted to said medium by the production of geldanamycin.

6. A process according to claim 5 which comprises cultivating *Streptomyces hygroscopicus* var. *geldanus*, having the identifying characteristics of NRRL 3602, in an aqueous nutrient medium containing a source of assimilable carbohydrate and assimilable nitrogen under aerobic conditions until substantial antibiotic activity is imparted to said medium by the production of geldanamycin and isolating the geldanamycin so produced.

7. A process according to claim 6 in which the isolation comprises filtering the medium, extracting the resulting filtrate with a water-immiscible solvent selected from the group consisting of lower alkanol, chlorinated lower-alkane, lower-alkanone, and isomeric hexanes, and recovering geldanamycin from the solvent extract.

References Cited

Miller: The Pfizer Handbook of Microbial Metabolites, McGraw-Hill Book Company, Inc., New York, 1962, pp. 590–591.

JEROME D. GOLDBERG, Primary Examiner

U.S. Cl. X.R.

195—80; 424—122